(12) United States Patent
Vincent (10) Patent No.: US 11,316,648 B2
(45) Date of Patent: Apr. 26, 2022

(54) METHOD AND SYSTEM FOR DATA PACKET TRANSMISSION IN DOWNLINK

(71) Applicant: Wipro Limited, Bangalore (IN)

(72) Inventor: Jimmy Vincent, Ammadam (IN)

(73) Assignee: Wipro Limited, Bangalore (IN)

( * ) Notice: Subject to any disclaimer, the term of this patent is extended or adjusted under 35 U.S.C. 154(b) by 71 days.

(21) Appl. No.: 17/016,644

(22) Filed: Sep. 10, 2020

(65) Prior Publication Data

US 2022/0029769 A1 Jan. 27, 2022

(30) Foreign Application Priority Data

Jul. 24, 2020 (IN) .............................. 202041031826

(51) Int. Cl.
*H04L 5/00* (2006.01)
*H04L 1/08* (2006.01)
*H04L 1/18* (2006.01)
*H04L 5/14* (2006.01)

(52) U.S. Cl.
CPC .............. *H04L 5/0055* (2013.01); *H04L 1/08* (2013.01); *H04L 1/1893* (2013.01); *H04L 5/14* (2013.01)

(58) Field of Classification Search
CPC ....... H04L 5/0055; H04L 1/08; H04L 1/1893; H04L 5/14
See application file for complete search history.

(56) References Cited

U.S. PATENT DOCUMENTS

| | | | |
|---|---|---|---|
| 8,312,337 B2 | 11/2012 | Park et al. | |
| 8,578,232 B2 | 11/2013 | Jongren et al. | |
| 8,599,816 B2 | 12/2013 | Kazmi et al. | |
| 8,855,069 B2 | 10/2014 | Lohr et al. | |
| 8,958,364 B2 | 2/2015 | Ostergaard et al. | |
| 2018/0302918 A1* | 10/2018 | Shaheen | H04W 28/0278 |
| 2019/0058986 A1* | 2/2019 | Loehr | H04L 1/1825 |
| 2019/0116006 A1 | 4/2019 | Lunttila et al. | |

(Continued)

OTHER PUBLICATIONS

Duhamel, P., et al., "Recent advances in HARQ communications", Apr. 2019, ICT (90 pages).

(Continued)

*Primary Examiner* — Hassan Kizou
*Assistant Examiner* — Abdullahi Ahmed
(74) *Attorney, Agent, or Firm* — Finnegan, Henderson, Farabow, Garrett & Dunner, LLP (57) ABSTRACT

The disclosure relates to method and system for transmitting a data packet in downlink in frequency division duplex (FDD) communication mode employing adaptive asynchronous Hybrid Automatic Repeat Request (HARQ) mode. The method includes receiving a current Channel Quality Indicator (CQI) from a user transceiver. The CQI is reported by the user transceiver at a periodic interval based on a radio frequency channel condition. The method further includes evaluating a degradation in the radio frequency channel condition based on a decrease in the current CQI with respect to a previously reported CQI. The method further includes retransmitting at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver.

15 Claims, 8 Drawing Sheets

(56) References Cited

U.S. PATENT DOCUMENTS

| | | | |
|---|---|---|---|
| 2019/0149273 A1* | 5/2019 | Golitschek Edler Von Elbwart | H04W 52/48 714/748 |
| 2020/0107375 A1* | 4/2020 | Lee | H04L 1/188 |
| 2021/0167897 A1* | 6/2021 | Seidel | H04L 1/1803 |
| 2021/0226734 A1* | 7/2021 | Fakoorian | H04L 1/1854 |
| 2021/0391958 A1* | 12/2021 | Yu | H04L 1/1845 |
| 2021/0399838 A1* | 12/2021 | Lou | H04L 1/1848 |

OTHER PUBLICATIONS

Berardinelli, G. t al., "Enabling Early HARQ Feedback in 5G Networks," 2016 IEEE 83rd Vehicular Technology Conference (VTC Spring), Nanjing, 2016, pp. 1-5.

Fehrenbach, T. et al., "URLLC Services in 5G Low Latency Enhancements for LTE," 2018 IEEE 88th Vehicular Technology Conference (VTC-Fall), Chicago, IL, USA, 2018, pp. 1-6.

Pokovi, G. et al., "MAC Layer Enhancements for Ultra-Reliable Low-Latency Communications in Cellular Networks", 2017 IEEE International Conference on Communications Workshops, Aalborg University, 7 pages.

Strodthoff, N. et al., "Enhanced Machine Learning Techniques for Early HARQ Feedback Prediction in 5G," IEEE Journal on Selected Areas in Communications, vol. 37, No. 11, pp. 2573-2587, Nov. 2019.

\* cited by examiner

METHOD AND SYSTEM FOR DATA PACKET TRANSMISSION IN DOWNLINK

TECHNICAL FIELD

This disclosure relates generally to communication network, and more particularly to method and system for transmitting a data packet in downlink in frequency division duplex (FDD) communication mode employing adaptive asynchronous Hybrid Automatic Repeat Request (HARQ) mode.

BACKGROUND

Some of the main criteria in $4^{th}$ generation (4G) or $5^{th}$ generation (5G) communication system include stringent latency requirements for data packets transmitted between a base transceiver (e.g., an evolved Node B (eNB) or next generation Node B (gNB)) and a user transceiver (e.g., user equipment (UE)), lesser data packet drops, and minimal latency requirement for the user transceiver communication even at higher mobility (e.g., at higher vehicular speeds). As will be appreciated, these criteria may enable better user experience. For example, the next generation mobile networks (NGMN) alliance proposed that 5G systems shall be able to provide 10 milliseconds (ms) End-to-End (E2E) latency in general, also referred to as High-Reliable Low Latency (HRLLC) in 3rd Generation Partnership Project (i.e., 3GPP), and 1 ms latency for use cases with extremely low latency requirements, also referred to as Ultra-Reliable Low Latency Communications (URLLC) in 3GPP.

In a Long-Term Evolution (LTE), Media Access Layer-Packet Data Unit (MAC-PDU) transmission happening in downlink (i.e., from the eNB to the UE) may be mapped to transport blocks at a physical layer. However, in some cases during the MAC-PDU transmission, an error (i.e., a block error) may be observed in reception of the MAC-PDU at the UE. Therefore, based on the observation of the error, the MAC-PDU having the error may need be retransmitted. The block error may be due to various noise, interference, and retrieval impact of the MAC-PDU at the receiver end. A conventional mechanism to enable faster recovery of the MAC-PDUs in 3GPP may include a Hybrid Automatic Repeat Request (HARQ) mechanism. The HARQ mechanism may perform most error correction based on feedback from peers. However, the conventional HARQ mechanism may cost additional latency time to recover the MAC-PDUs at the UE.

Figure 1:
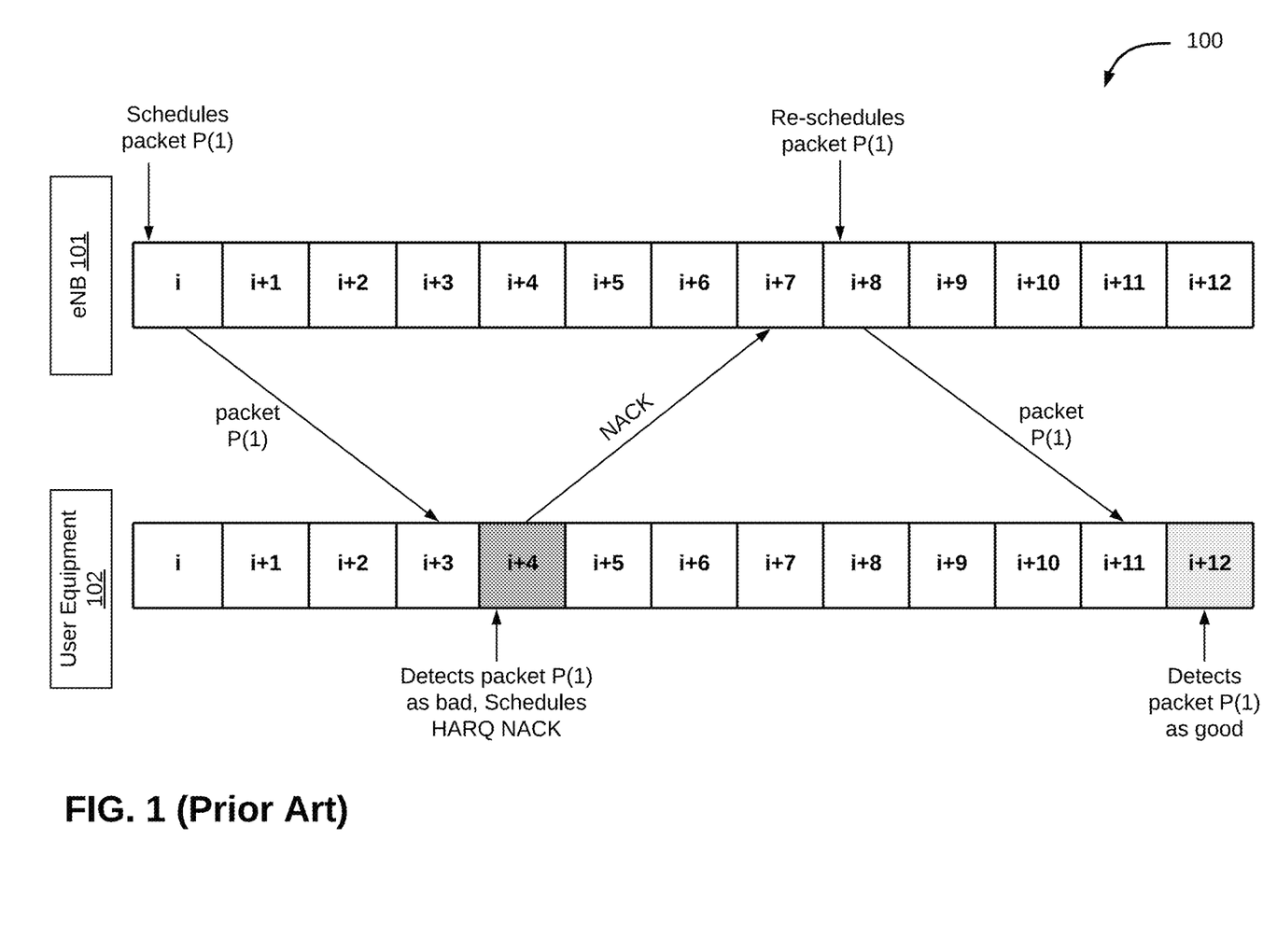
FIG. 1 illustrates an existing mechanism for transmitting a data packet in downlink in frequency division duplex (FDD) communication mode employing adaptive asynchronous Hybrid Automatic Repeat Request (HARQ) mode.

By way of example, referring to FIG. 1, for downlink communications 100 using frequency division duplex (FDD) communication mode employing adaptive asynchronous HARQ mode, a HARQ retransmission may itself need a minimum of additional 8 subframes or 8 millisecond or even more to retrieve the MAC-PDU at the UE 102, in case of the error. In addition, the latency may be attributed due to scheduling delay for the MAC-PDU and processing delay for it's HARQ response at the eNB 101, and processing delay for the MAC-PDU and scheduling delay for it's HARQ response at the UE 102. However, the latency that may be attributed may itself be quite high as compared to the 4G/5G latency requirements in a radio interface. Further, during bad radio conditions or when the radio channel is fading, there may be high chance of the MAC-PDUs decoding error at the UE 102. This may result in a retransmission failure and sending of HARQ-NACK signal back to the eNB 101. In addition, when a first retransmission may fail, then more time may be required for the MAC-PDUs retrieval at the UE 102 due to further retransmissions. Further, the retransmission delay may impact delay in the MAC-PDUs delivery to higher layers. This, in turn, may impact performance of various critical Real time applications relaying on the LTE network. In other words, during channel fading conditions, chances for the retransmissions of the MAC-PDUs may increase, which, in turn, may increase an overall data packet latency. Hence, it is important to reduce the retransmission delay in order to improve the latency observed by the 5G/LTE applications.

Some of the existing mechanisms may improve the HARQ timing by early decoding of the MAC-PDUs. Similarly, some of the existing mechanisms may improve the HARQ timing based on superimposition of smaller Transition Time Interval (TTI) packets or by reserving HARQ time slots for feedback. However, none of the existing mechanisms claims for the retransmission latency improvements in situations comprising channel fading or degrading conditions, high interference, and cell edge scenarios, where there is a higher probability of data packet decoding failure at the UE (i.e., at user transceiver). Moreover, the existing mechanisms may have higher probability of false positives while decoding the MAC-PDUs at the UE. Additionally, the existing mechanisms may be resource intensive in terms of power, CPU, and memory requirements.

Therefore, it is desirable to provide a robust, efficient, and cost-effective mechanism that eliminates problems existing in the conventional mechanisms and that provides faster retransmission of the MAC-PDUs in scenarios having high probability of data packet decoding failure at the UE.

SUMMARY

In an embodiment, a method of transmitting a data packet in downlink in frequency division duplex (FDD) communication mode employing adaptive asynchronous Hybrid Automatic Repeat Request (HARQ) mode is disclosed. In one example, the method may include receiving a current Channel Quality Indicator (CQI) from a user transceiver. The CQI may be reported by the user transceiver at a periodic interval based on a radio frequency channel condition. The method may further include evaluating a degradation in the radio frequency channel condition based on a decrease in the current CQI with respect to a previously reported CQI. The method may further include retransmitting at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver. The set of transmitted data packets may be transmitted to the user transceiver in FDD communication mode employing adaptive asynchronous HARQ mode.

In another embodiment, a system for transmitting a data packet in downlink in FDD communication mode employing adaptive asynchronous HARQ mode is disclosed. In one example, the system may include a base transceiver communicatively coupled to the user transceiver. The base transceiver may include a processor and a memory communicatively coupled to the processor, wherein the memory stores processor-executable instructions, which, on execution, causes the processor to receive a current CQI from a user transceiver. The CQI may be reported by the user transceiver at a periodic interval based on a radio frequency channel condition. The processor-executable instructions, on execution, may further cause the processor to evaluate a degradation in the radio frequency channel condition based on a decrease in the current CQI with respect to a previously reported CQI. The processor-executable instructions, on execution, may further cause the processor to retransmit at least one of a set of transmitted data packets stored in a HARQ retransmission buffer to the user transceiver, based on the degradation in the radio frequency channel condition and without waiting for a corresponding HARQ NACK signal from the user transceiver. The set of transmitted data packets may be transmitted to the user transceiver in FDD communication mode employing adaptive asynchronous HARQ mode.

In yet another embodiment, a non-transitory computer-readable storage medium, storing computer-executable instructions for transmitting a data packet in downlink in FDD communication mode employing adaptive asynchronous HARQ mode is disclosed. The stored instructions, when executed by a processor, may cause the processor to perform operations including receiving a current CQI from a user transceiver. The CQI may be reported by the user transceiver at a periodic interval based on a radio frequency channel condition. The operations further include evaluating a degradation in the radio frequency channel condition based on a decrease in the current CQI with respect to a previously reported CQI. The operations may further include retransmitting at least one of a set of transmitted data packets stored in a HARQ retransmission buffer to the user transceiver, based on the degradation in the radio frequency channel condition and without waiting for a corresponding HARQ NACK signal from the user transceiver. The set of transmitted data packets may be transmitted to the user transceiver in FDD communication mode employing adaptive asynchronous HARQ mode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 2:
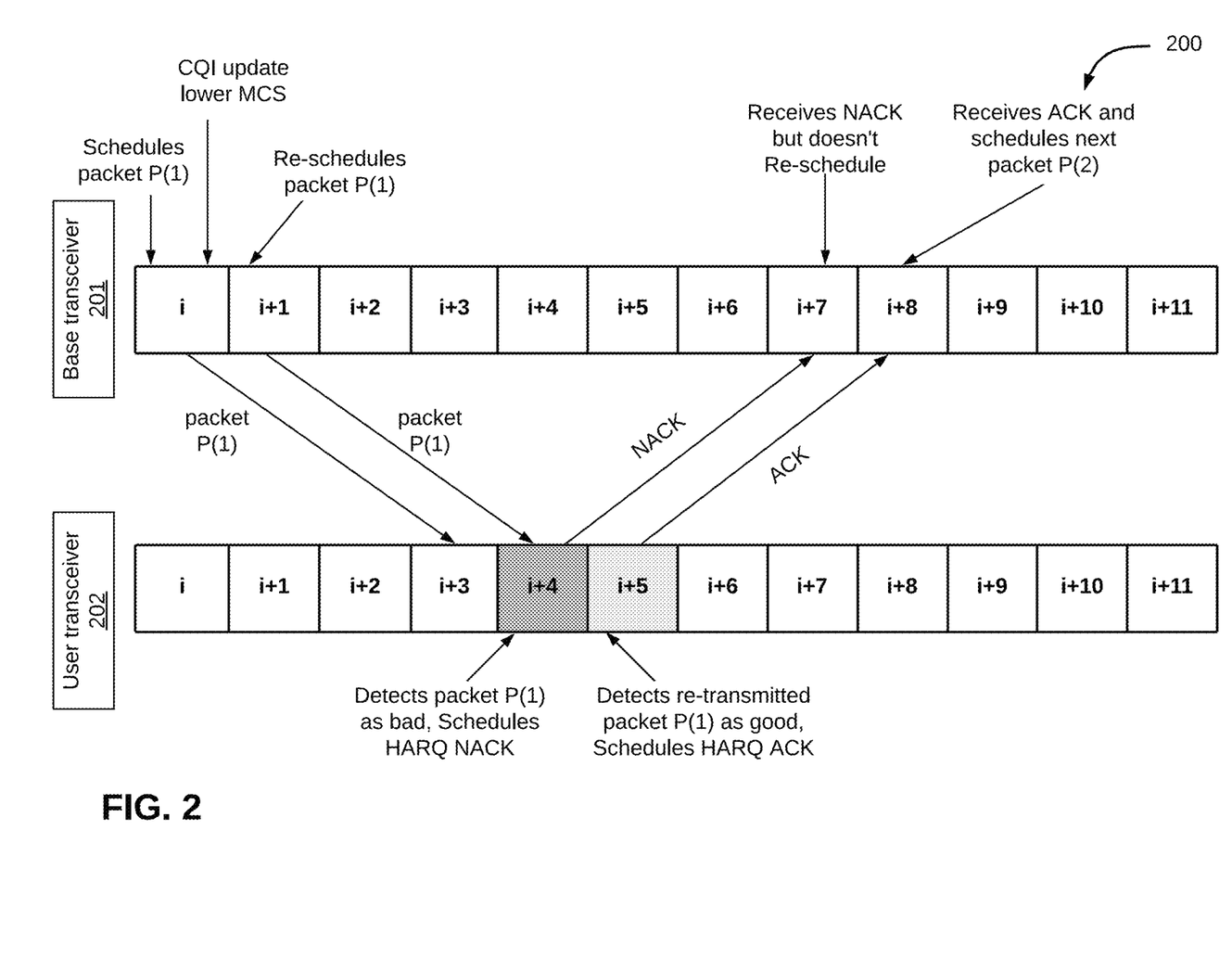
FIG. 2 illustrates an exemplary mechanism for transmitting a data packet in downlink in FDD communication mode employing adaptive asynchronous HARQ mode, in accordance with some embodiments of the present disclosure.

Referring now to FIG. 2, an exemplary mechanism 200 for transmitting a data packet is illustrated, in accordance with some embodiments of the present disclosure. It should be noted that the data packet transmission mechanism 200 may be applied to downlink transmissions in frequency division duplex (FDD) communication mode that employs adaptive asynchronous Hybrid Automatic Repeat Request (HARQ) mode. The illustrated mechanism 200 involves an early retransmission of one or more of a set of transmitted data packets in a downlink. In an embodiment, the set of transmitted data packets may correspond to more recent of data packets transmitted in last eight milliseconds or data packets transmitted since the previously reported Channel Quality Indicator (CQI) (i.e., the ongoing CQI of the HARQ process). The retransmission of the one or more data packets from the set of transmitted data packets may be done prior to receiving a HARQ feedback (i.e., HARQ NACK signal) for the at least one data packet from a user transceiver 202. In an embodiment, the user transceiver 202 may correspond to a user equipment (UE). Moreover, the retransmission of the at least one data packet may be done based on a degradation in the downlink radio conditions as detected at the user transceiver 202. The degradation in the downlink condition may be detected based on a current CQI (i.e., newly reported CQI) reported by the user transceiver 202. The current CQI reported by the user transceiver 202 may in turn corresponds to a $3^{rd}$ Generation Partnership Project (3GPP) defined Modulation and Coding Scheme (MCS) as per the request from the user transceiver 202. The mechanism 200 may reduce a retransmission delay based on a Radio Frequency (RF) quality degradation indicated by the user transceiver 202.

In the mechanism 200, a base transceiver 201 may schedule sending of a data packet P(1) at a time instance T. In an embodiment, the base transceiver 201 may correspond to an eNodeB (eNB) of the Long-Term Evolution (LTE) communication network. In particular, the LTE may implement a transport channel referred to as a Downlink Shared Channel (DL-SCH) for the transmission of user data, dedicated control and user-specific higher layer information and downlink system information. The data packet P(1) may then be received by the user transceiver 202 at time instance 'i+3'. However, if the data packet P(1) received at the time instance 'i+3' is identified to be a faulty data packet, then the user transceiver 202 may send a Negative Acknowledgement (NACK) for the data packet P(1) received at the time instance 'i+3'. In an embodiment, the NACK signal may also be referred to as a HARQ NACK signal. In an embodiment, the user transceiver 202 may implement a Physical Uplink Control Channel (PUCCH) that carries a set of information called Uplink Control Information (UCI).

The HARQ NACK signal send by the user transceiver 202 is supposed to be received by the base transceiver 201 at a time instance 'i+7'. However, based on the mechanism 200 described herein, the base transceiver 201 may not wait for the HARQ NACK signal and may evaluate the current CQI received from the user transceiver 202. It should be noted that, the current CQI may be reported by the user transceiver 202 at a periodic interval based on a radio frequency channel condition. Thereafter, the current CQI may be evaluated by the base transceiver 201 in order to identify a need of early retransmission of the data packet P(1). The need for early retransmission of the data packet P(1) may be identified based on a decrease in the current CQI (i.e., newly reported CQI) received with respect to a previously reported CQI (i.e., the ongoing CQI of the HARQ process). Further, the decrease identified in the current CQI may be compared with a preconfigured CQI decrease threshold.

Thereafter, based on evaluation of the current CQI against the previously reported CQI, if the decrease in a value of the current CQI is detected to be more than the preconfigured CQI decrease threshold, then the base transceiver 201 may retransmit the data packet P(1) at a time instance 'i+n' where n<8 (say, 'i+1'). It should be noted that, the data packet P(1) may be retransmitted prior receiving the HARQ NACK signal corresponding to the data packet P(1). Thereafter, the retransmitted data packet P(1) may be received at the user transceiver 202 at a time instance 'i+n+3' (say, 'i+4'). On receiving the retransmitted data packet, the user transceiver 202 may decode the retransmitted data packet P(1). In an embodiment, upon receiving the retransmitted data packet P(1), the user transceiver 202 may apply a chase combining mechanism to decode the data packet P(1), if the retransmission of the data packet P(1) is done at same Modulation and Coding Scheme (MCS) as that of transmission of data packet P(1). The chase combining mechanism may successfully decode the data packet P(1) based on combined decoding of two instances of data packet P(1), i.e., the data packet P(1) received at the time instance 'i+3' and the retransmitted data packet P(1) received at the time instance 'i+n+3' (i.e., 'i+4'). As will be appreciated, the chase combining of retransmitted data packet (i.e., data packet P(1) received at 'i+n+3') with previous instance of same data packet (i.e., data packet P(1) received at 'i+3') may increase a likelihood of successfully decoding the data packet in channel degrading conditions. Thereafter, the user transceiver 202 may send an acknowledge (ACK) corresponding to the data packet P(1) at a time instance 'i+n+4' (say, 'i+5') to the base transceiver 201 regarding correctly decoding the data packet based on the retransmitted data packet P(1) received at the time instance 'i+n+3' (say, 'i+4'). In an embodiment, the ACK signal may also be referred to as a HARQ ACK.

Figure 3:
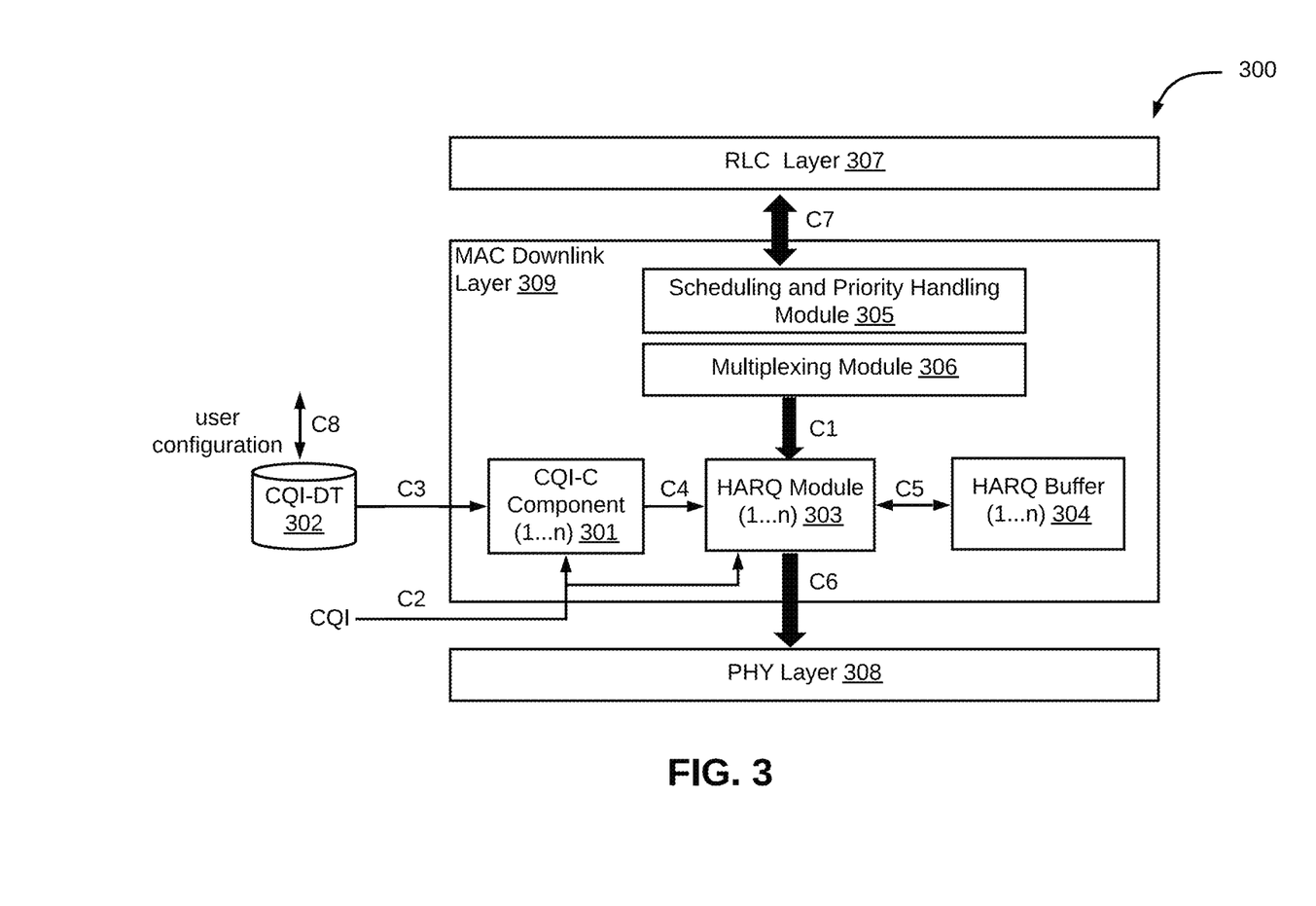
FIG. 3 is a functional block diagram of an exemplary system for transmitting a data packet in downlink in FDD communication mode employing adaptive asynchronous HARQ mode, in accordance with some embodiments of the present disclosure.

Referring now to FIG. 3, a functional block diagram of an exemplary system 300 for transmitting a data packet in downlink in FDD communication mode employing adaptive asynchronous HARQ mode is illustrated, in accordance with some embodiments of the present disclosure. In an embodiment, the system 300 includes one or more CQI-C components $301_1$-$301_n$ (collectively referred to as CQI-C component 301), a CQI-Delta Threshold (CQI-DT) 302, one or more HARQ modules $303_1$-$303_n$ (collectively referred to as HARQ module 303), one or more HARQ buffers $304_1$-$304_n$ (collectively referred to as HARQ buffer 304), a scheduling and priority handling module 305, a multiplexing module 306, a Radio Link Control (RLC) layer 307, a physical layer 308, and a MAC downlink layer 309. As will be appreciated, the system 300 may also include various other modules than those mentioned above so as to transmit the data packet in the downlink. Further, as will be appreciated by those skilled in the art, all such aforementioned modules 301-306 may be represented as a single module or a combination of different modules. Moreover, as will be appreciated by those skilled in the art, each of the modules 301-306 may reside, in whole or in parts, on one device or multiple devices in communication with each other.

The CQI-C component 301 may store CQI values reported from a user transceiver 202 (e.g., UE). On receiving a new CQI Indication, the CQI-C component 301 may checks a delta of the current CQI (also referred to as a recent CQI or newly reported CQI) with respect to the previously reported CQI (i.e., the ongoing CQI) for the user transceiver 202. In addition, the delta of the current CQI may be checked against a pre-configured CQI-Delta Threshold (CQI-DT) value. In an embodiment, the pre-configured CQI-DT value may also be referred to as the preconfigured CQI decrease threshold. Moreover, when the delta may be identified to be greater than the pre-configured CQI-DT value, the CQI-C component 301 may indicate to the HARQ module 303 to retransmit at least one of the set of transmitted data packets. In an embodiment, the HARQ module 303 may implement a HARQ process. The data packet may also be referred to as Media Access Layer Packet Data Unit (MAC-PDU) or simply packet data unit (PDU). It should be noted that, a CQI-C component 301 may be associated with each HARQ module 303. By way of an example, the HARQ module 303 may implement 'n-number' of HARQ process. Thus, each of the 'n-number' of HARQ process may have a CQI-C component associated with it. In other words, each of the CQI-C components $301_1$-$301_n$ may be associated with each of the HARQ modules $303_1$-$303_n$. In an embodiment, the CQI-C component 301 may read the preconfigured CQI-DT value via interface 'C3'.

The CQI-DT 302 may correspond to a register that may store the preconfigured CQI-DT value. The CQI-DT value may generally be pre-configured by a user. It should be noted that, since the CQI-DT value may be preconfigured by the user, the user may be able to control a CQI based retransmission technique performed by various modules of the system 300. By way of an example, suppose the CQI-DT value may be preconfigured by the user as '0' (i.e., a default value). Further, on receiving a new CQI update from the UE, the new CQI may be compared against a previously reported CQI. A decrease in the new CQI with respect to the previously reported CQI may indicate a degradation in the radio frequency channel condition. The decrease is checked against the preconfigured CQI-DT value stored in the CQI-DT 302 so as to evaluate the degradation. Thereafter, based on the evaluation of the degradation in the radio frequency channel condition, the CQI-C component 301 may generate a retransmit indication signal, which may trigger the retransmission of at least one of the set of transmitted data packets. Thus, the CQI-C component 301 may trigger the retransmission of at least one of the set of transmitted data packets upon identifying that the decrease in new CQI with respect to the previously reported CQI (i.e., previous CQI-new COI) is more than the preconfigured CQI-DT value. In addition, when the preconfigured CQI-DT value is kept higher, than the chances of retransmission of at least one of the set of transmitted data packets may be reduced. In an embodiment, the CQI-DT value may be preconfigured by the user via an external interface i.e., 'C8'.

The HARQ module 303 (implementing the HARQ process) may perform transmission of the MAC-PDUs. Thereafter, the HARQ module 303 may wait for HARQ ACK to be received for each of the MAC-PDUs transmitted. The transmitted MAC-PDUs may be maintained the HARQ buffer 304 until a successful HARQ ACK may be received corresponding to each of the transmitted MAC-PDUs. Apart from existing functionalities of the HARQ module 303, the HARQ module 303 may retransmit the MAC-PDUs of a particular UE based on the retransmit indication signal received from the CQI-C component 301. In order to retransmit, the HARQ module 303 may select at least one of the MAC-PDUs from the transmitted MAC-PDUs maintained the HARQ buffer 304 for the particular UE that has been transmitted within last 8 millisecond or that has been transmitted since last CQI indication (also referred to as previously reported CQI), whichever may be later. In other words, a maximum of up to 8 MAC-PDUs transmitted to the user transceiver 202 (i.e., lower of those transmitted in last eight milliseconds or those transmitted since previously reported CQI) may be selected for the retransmission. Thereafter, the retransmitted MAC-PDUs may be marked. Further, if the HARQ NACK signal may be received corresponding to the transmitted MAC-PDUs, but the MAC-PDUs is already marked (i.e., it has been already retransmitted), then that MAC-PDUs is not retransmitted again. Additionally, in an embodiment, the marked MAC-PDU, that is not retransmitted again upon receiving the HARQ NACK, may be unmarked upon receiving the HARQ NACK. It should be noted that, generally a Long-term Evolution (LTE) eNodeB may have 'n' HARQ process, where value of 'n' may be '8'. In an embodiment, the HARQ module 303 may receive the retransmit indication single along with specific UE details from the CQI-C component 301 via interface 'C4'. In addition, the HARQ module 303 may store the MAC-PDUs scheduled for retransmission at the HARQ buffer 304 via interface 'C5'. Moreover, the HARQ module 303 may also retrieve the MAC-PDUs from the HARQ buffer 304 in case of the retransmission via interface 'C5'. Also, the HARQ module 303 may provide the MAC-PDUs in the downlink for the retransmission to the physical layer 308 via interface 'C6' (also referred to as transport interface).

The HARQ buffer 304 (also referred to as HARQ retransmission buffer) may store the MAC-PDUs transmitted to the user transceiver 202. Each of the transmitted MAC-PDUs may be stored in the HARQ buffer 304 until the MAC downlink layer 309 has not received HARQ ACK for that MAC-PDU. Alternatively, each of the transmitted MAC-PDUs may be stored in the HARQ buffer 304 until a re-transmit time has not expired for that MAC-PDU. In should be noted that, the HARQ buffer 304 may be associated with each of the HARQ process implemented by the HARQ module 303. By way of an example, as per an existing method, each process in n-number of HARQ process may have a separate HARQ buffer associated with it. Again, it should be noted that, a HARQ buffer 304 may be associated with each HARQ module 303. By way of an example, the HARQ module 303 may implement 'n-number' of HARQ process. Thus, each of the 'n-number' of HARQ process may have a HARQ buffer associated with it. In other words, each of the HARQ buffers $304_1$-$304_n$ may be associated with each of the HARQ modules $303_1$-$303_n$.

The scheduling and priority handling module 305 may be responsible for scheduling each of the MAC-PDUs based on a priority associated with each of the MAC-PDUs. The priority associated with each of the MAC-PDUs may be assigned by core network of the communication network (e.g., LTE communication network). In particular, a scheduler in the scheduling and priority handling module 305 schedules the MAC PDUs from the scheduler queues in order to be transmitted in downlink during a resource availability instance (timeslot), i.e., for a TTI (Time to live interval) which is usually 1 ms. Further, a priority handler in the scheduling and priority handling module 305 selects the appropriate MAC PDU in the downlink and maps to the scheduler queue in order be transmitted towards the user transceiver 202. It should be noted that the priority handler selects and maps the MAC PDU to a particular queue based on the packet QCI (QoS Class Indicator). In an embodiment, the scheduling and priority handling module 305 may receive the RLC PDU via interface 'C7' and provide the same to the multiplexing module 306 upon scheduling and prioritization. The multiplexing module 306 may then multiplex the downlink data and downlink control information into a single MAC-PDU that is to be transmitted to the user transceiver 202. In particular, the multiplexing module 306 may provide a final multiplexed MAC-PDU to the HARQ module 303. In addition, the multiplexing module 306 may send the final multiplexed MAC-PDU to the HARQ module 303 via interface 'C1'. The final multiplexed MAC-PDU may include MAC header and padding information, for the transmission to the user transceiver 202 by the HARQ module 303.

The RLC layer 307 of the system 300 may be responsible for segmentation and reassembly of Radio Link Control-Service Data Unit (RLC-SDUs) in order to form an RLC PDU. The RLC PDU may be formed such that it may be suitable for transmission over a radio bearer with current MCS scheme. The physical layer 308 may be responsible for performing all transmission related functionality over the received PDUs. The transmission related functionalities may include channel encoding, scrambling, layer mapping, and Forward Error Correction (FEC). In an embodiment, the physical layer 308 may be configured to provides the CQI indication from the user transceiver 202 to the CQI-C component 301 and the HARQ module 303 via interface 'C2'.

It should be noted that all such aforementioned modules 301-306 of the system 300 may be implemented in programmable hardware devices such as programmable gate arrays, programmable array logic, programmable logic devices, or the like. Alternatively, all such aforementioned modules 301-306 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

Figure 4:
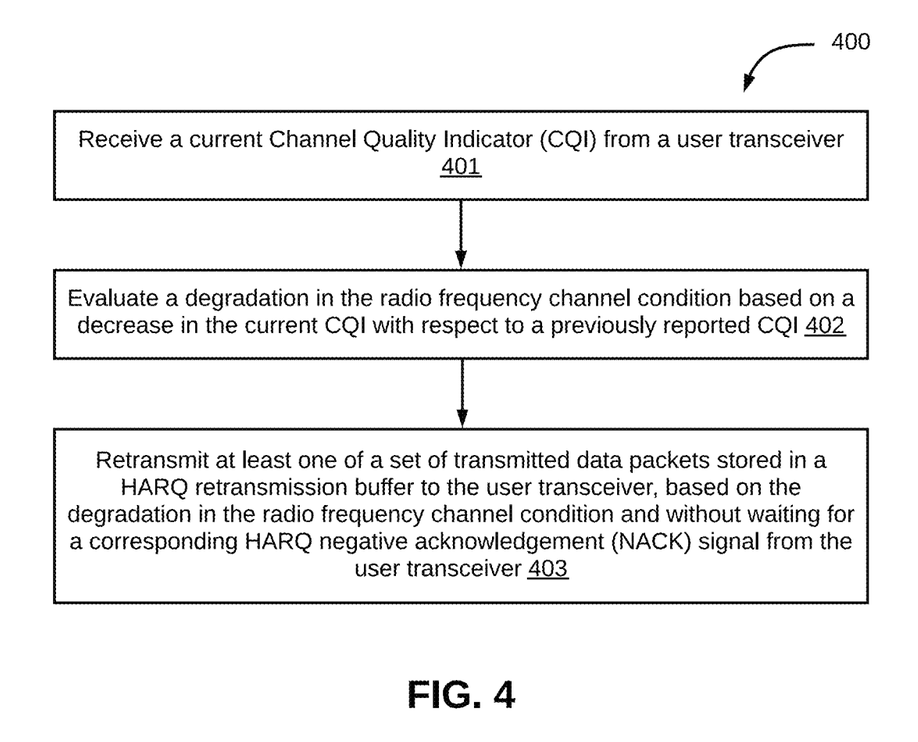
FIG. 4 is a flow diagram of an exemplary process for transmitting a data packet in downlink in FDD communication mode employing adaptive asynchronous HARQ mode, in accordance with some embodiments of the present disclosure.

Referring now to FIG. 4, a flow diagram of an exemplary process 400 for transmitting a data packet in downlink in FDD communication mode employing adaptive asynchronous HARQ mode is depicted via a flowchart, in accordance with some embodiments of the present disclosure. At step 401, the base transceiver receives a current CQI from a user transceiver 202. In an embodiment, the CQI may be reported by the user transceiver 202 to the base transceiver 201 at a periodic interval based on a radio frequency channel condition. Moreover, in an embodiment, the CQI may be based on an observed signal-to-interference-plus-noise ratio (SINR) at the user transceiver 202 and may corresponds to the Modulation and Coding Scheme (MCS) value indicating a downlink transmission data rate. At step 402, the base transceiver 201 may evaluate a degradation in the radio frequency channel condition based on a decrease in the current CQI with respect to a previously reported CQI. In an embodiment, the degradation in the radio frequency channel condition may be evaluated by comparing the decrease in the current CQI evaluated with respect to the previously reported CQI against a preconfigured CQI decrease threshold. In an embodiment, the preconfigured CQI decrease threshold may correspond to the preconfigured CQI-DT value.

At step 403, the base transceiver 201 may retransmit at least one of a set of transmitted data packets stored in a HARQ retransmission buffer (i.e., HARQ buffer 304) to the user transceiver 202. In an embodiment, the data packet may comprise of the Media Access Layer Packet Data Unit (MAC-PDU). Moreover, the retransmission may be performed based on the degradation in the radio frequency channel condition and without waiting for a corresponding HARQ negative acknowledgement (NACK) signal (also referred to as the HARQ NACK) from the user transceiver 202. Further, in an embodiment, the retransmission may be performed prior to changing the MCS at the base transceiver 201. It should be noted that, for the same MAC-PDU selected for retransmission to be fit in to the Physical frame (i.e., TBF), the same MCS needs to be employed. Also, as discussed above, the transmission and retransmission of data packets needs to be done at same MCS in order to perform the chase combining at the user transceiver 202. However, after the retransmission, the MCS towards that user transceiver 202 may be changed based on the CQI indication received. As will be appreciated, the transmission and the retransmission may be performed in FDD communication mode employing adaptive asynchronous HARQ mode. In an embodiment, the set of transmitted data packets may correspond to more recent of data packets transmitted in last eight milliseconds or data packets transmitted since the previously reported CQI.

In an embodiment, upon retransmission or upon being scheduled for retransmission based on the retransmit indication signal, the base transceiver 201 may mark the at least one of the set of transmitted data packets for non-retransmission upon receipt of the corresponding HARQ NACK signal. Thereafter, if the base transceiver 201 receives the HARQ NACK signal corresponding to a transmitted data packet, the base transceiver 201 may perform a check in order to identify whether the transmitted data packet is marked or not (i.e., whether the transmitted data packet has been already been retransmitted or not). If the transmitted data packet is not marked, then the base transceiver 201 may retransmit the same as per the usual HARQ procedure. However, in an additional embodiment, if the transmitted data packet is marked, then the base transceiver 201 may further unmark the same and wait for response from the user transceiver. Further, in an embodiment, the base transceiver 201 may remove the transmitted or the retransmitted data packet from the HARQ retransmission buffer 304 upon receiving a corresponding HARQ acknowledgement (ACK) signal as per the usual HARQ procedure.

Figure 5:
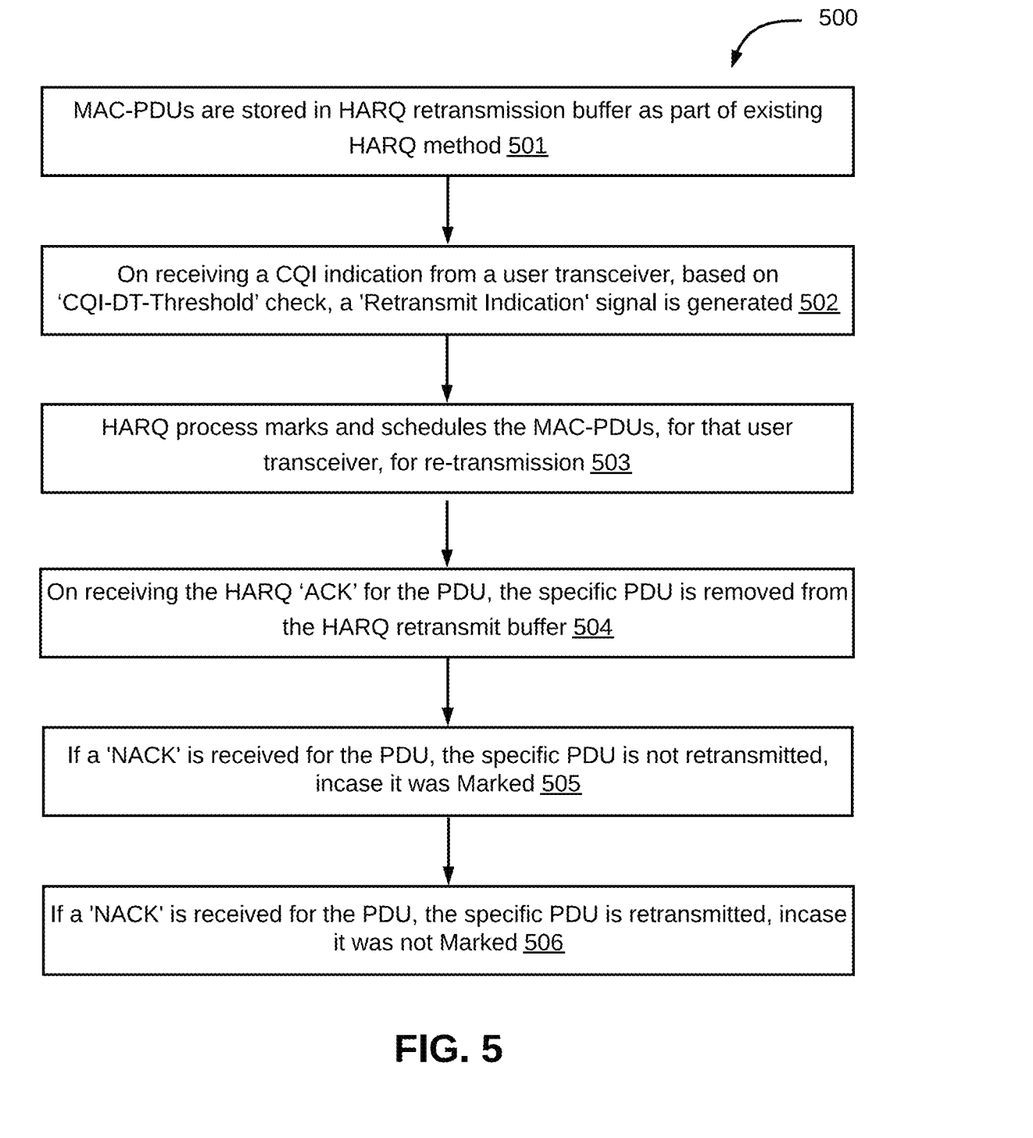
FIG. 5 is a flow diagram of a detailed exemplary process for transmitting a data packet in downlink in FDD communication mode employing adaptive asynchronous HARQ mode, in accordance with some embodiments of the present disclosure.

Referring now to FIG. 5, a flow diagram of a detailed exemplary process 500 for transmitting a data packet in downlink in FDD communication mode employing adaptive asynchronous HARQ mode is depicted via a flowchart, in accordance with some embodiments of the present disclosure. At step 501, as a part of an existing HARQ process, the MAC-PDUs (also referred to as the PDUs) may be store in the HARQ retransmission buffer. The MAC-PDUs may correspond to the set of transmitted data packets. In an embodiment, in each of the HARQ process, the MAC-PDUs may be stored for retransmission in the HARQ retransmission buffer. Moreover, the MAC-PDUs may be stored in the HARQ buffer once the MAC-PDUs may be scheduled for transmission. As will be appreciated, the existing HARQ process may correspond to an existing LTE HARQ procedure. Once the MAC-PDUs may be scheduled by MAC layer 309, the MAC-PDUs may be transmitted via antenna after performing required physical and radio frequency processing, at a later predetermined time.

At step 502, on receiving the CQI indication, the CQI-C component 301 may perform a check to determine whether the retransmit indication is to be generated towards the HARQ process. The check may be performed based on the preconfigured CQI-DT value. It should be noted that, the CQI-DT value may be preconfigured by the user. In an embodiment, the preconfigured CQI-DT value may correspond to the preconfigured CQI decrease threshold. In this step, the previously reported CQI for the UE may be fetched from the memory. Further, the current CQI may be received from the physical layer 308. Thereafter, the difference may be computed based on the previously reported CQI and the current CQI as per equation (1) below:

$$\text{Difference} = \text{Previously reported CQI} - \text{Current CQI} \qquad \text{Equation (1)}$$

Further, when the difference computed may be identified to be greater than the preconfigured CQI-DT value, a retransmit indication signal may be generated. The retransmit indication signal may be transmitted to an associated HARQ process in the HARQ module 303 along with specific UE information. Moreover, upon receipt of the retransmit indication signal, early retransmission may be triggered for the at least one transmitted data packet (also referred to as transmitted MAC-PDU). By way of an example, when the default value for the CQI-DT is preconfigured as '0', the early retransmission may be triggered even if value of the current CQI is identified to be less by one than the previously reported CQI. In an embodiment, the user may configure the value of the CQI-DT to a various threshold levels in order to control early retransmissions of the transmitted data packets, based on the CQI indication. The CQI indication may indicate value of the current CQI. The generation of the retransmit indication signal has been explained further in conjunction with FIG. 6.

At step 503, the HARQ process implemented by the HARQ module 303 may mark and schedule the MAC-PDUs for retransmission. On receiving the retransmit indication signal from the CQI-C component 301, the HARQ process may select at least one of the set of transmitted data packets for the user transceiver 202. It should be noted that the set of transmitted data packets may be more recent of data packets transmitted in last eight milliseconds or data packets transmitted since the previously reported CQI. Thereafter, the HARQ process may retransmit the selected transmitted data packets to the user transceiver 202 in next consecutive one or more sub-frames time slots. Moreover, the HARQ process may retransmit the selected transmitted data packets, unless the HARQ ACK signal may be received for the selected transmitted data packets. In addition, the HARQ process may mark the selected transmitted data packet that has now been retransmitted for non-retransmission upon subsequent reception of the HARQ-NACK signal. The retransmission of the transmitted data packets and marking of the retransmitted data packets have been further explained in conjunction with FIG. 7.

At step 504, the HARQ process implemented by the HARQ module 303 may receive the HARQ-ACK signal from the user transceiver 202 for the retransmitted data packet. Upon the receipt of the HARQ-ACK signal, the HARQ process may remove the retransmitted data packet from the HARQ retransmission buffer. At step 505, the HARQ process may perform a check on receiving the HARQ NACK signal for the transmitted data packet from the user transceiver 202. The check may be performed to identify whether the transmitted data packet is marked or not (i.e., whether the transmitted data packet is already retransmitted or not). In other words, the check may be performed to identify whether the transmitted data packet has already been retransmitted early in accordance with aspects of the present disclosure or should be retransmitted as a part of standard HARQ procedure. Upon identifying that the transmitted data packet is already marked as retransmitted, the HARQ process may not retransmit the transmitted data packet as per the standard HARQ process. In an embodiment, the HARQ process may further unmark the marked transmitted data packet and wait for HARQ ACK or HARQ NACK signal. However, at step 506, upon identifying that the transmitted data packet is not marked (i.e., if the transmitted data packet has not already been retransmitted early in accordance with aspects of the present disclosure), then the transmitted data packet may be retransmitted as a part of standard HARQ procedure upon receipt of the corresponding HARQ NACK signal. A procedure performed by the HARQ process on receiving the HARQ-ACK signal and the HARK-NACK signal is further explained in conjunction with the FIG. 8.

Figure 6:
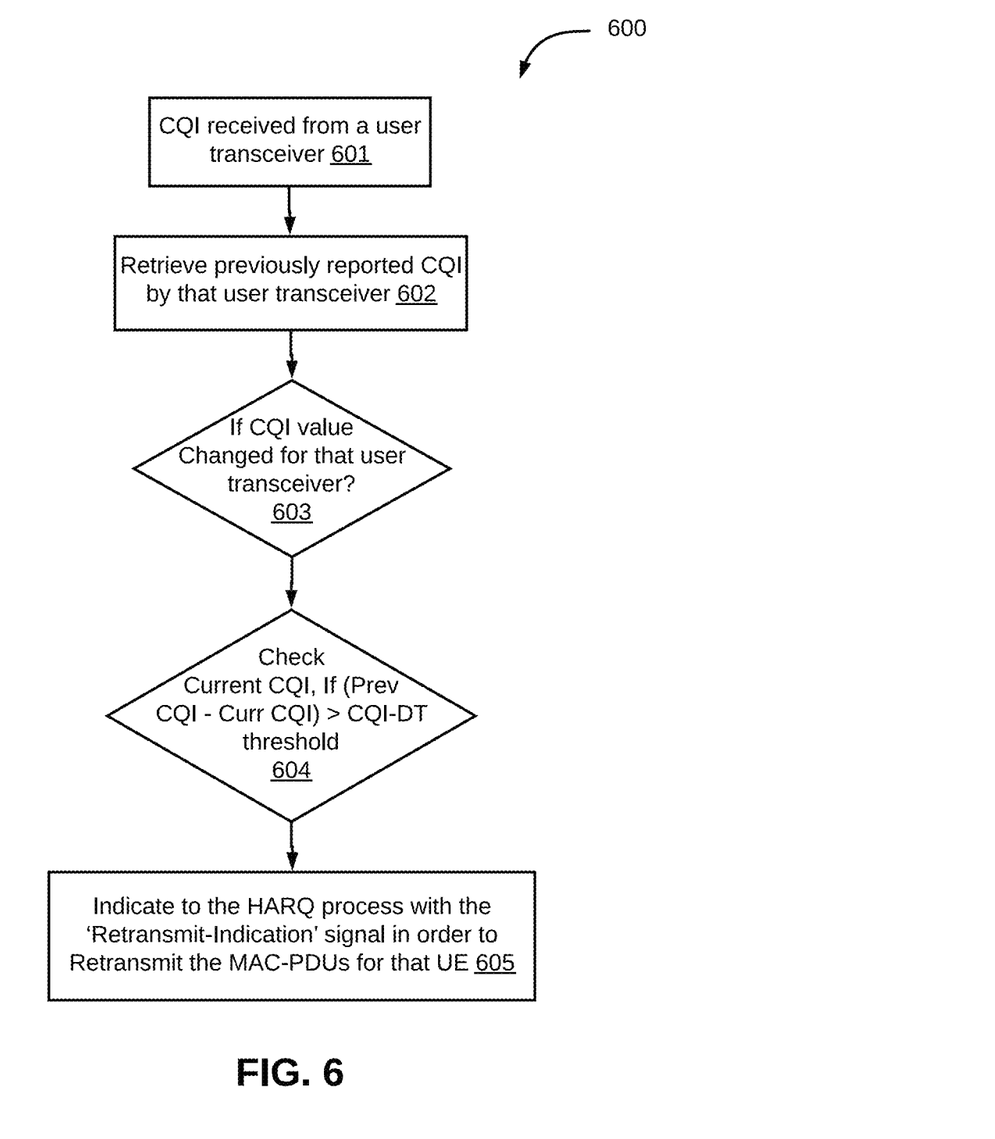
FIG. 6 is a flow diagram of an exemplary process for generating a retransmit indication signal based on a Channel Quality Indicator (CQI) received from a user transceiver, in accordance with some embodiments of the present disclosure.

Referring now to FIG. 6, a flow diagram of an exemplary process 600 for generating a retransmit indication signal based on a based on a CQI received from a user transceiver is depicted via a flowchart, in accordance with some embodiments of the present disclosure. At step 601, the CQI-C component 301 may receive the current CQI from a user transceiver 202. At step 602, the CQI-C component 301 may retrieve the previously reported CQI for that user transceiver 202. At step 603, the CQI-C component 301 may identify a change in value of the CQI. The change in value of the CQI may be identified based on the difference computed between the previously reported CQI and the current CQI as per equation (1). At step 604, the CQI-C component 301 may perform a check to determine whether the decrease in value of the current CQI is greater than the preconfigured CQI-DT threshold. The CQI-DT threshold may be preconfigured by the user. In an embodiment, the CQI-DT threshold may correspond to the CQI-DT decrease threshold. At step 605, the CQI-C component 301 may generate a 'retransmit indication signal' so as to indicate the HARQ process for that user transceiver 202 to perform early retransmission of the transmitted data packets to that user transceiver 202.

Figure 7:
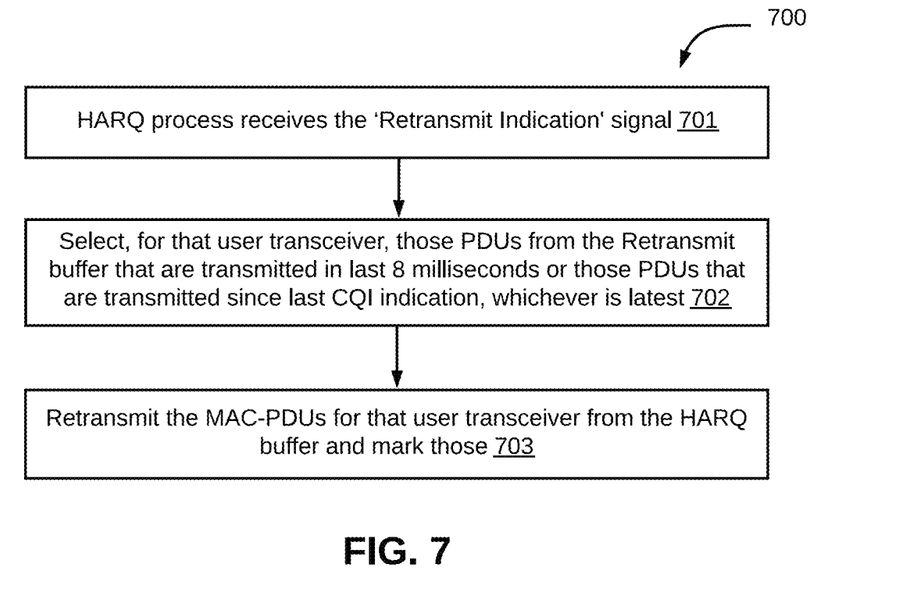
FIG. 7 is a flow diagram of an exemplary process for retransmitting at least one of a set of transmitted data packets upon receiving the retransmit indication signal, in accordance with some embodiments of the present disclosure.

Referring now to FIG. 7, a flow diagram of an exemplary process 700 for retransmitting at least one of the set of transmitted data packets upon receiving the retransmit indication signal is depicted via a flowchart, in accordance with some embodiments of the present disclosure. At step 701, the HARQ process may receive the retransmit indication signal from the CQI-C component 301. The HARQ process may be implemented by the HARQ module 303. Upon receipt of the retransmit indication signal from the CQI-C 301, at step 702, the HARQ process may select the at least one of the set of transmitted data packets for the UE. The selection of the at least one of the set of transmitted data packets that may be done from more recent of the data packets transmitted in last eight milliseconds or the data packets transmitted since the previously reported CQI. At step 703, the HARQ process may retransmit the selected transmitted data packets. It should be noted that, the HARQ process may retransmit each of the selected transmitted data packets, unless the corresponding HARQ ACK may be received for each of the selected transmitted data packets. In addition, the HARQ process may mark the retransmitted data packets for non-retransmission upon receipt of the corresponding HARQ NACK signal.

Figure 8:
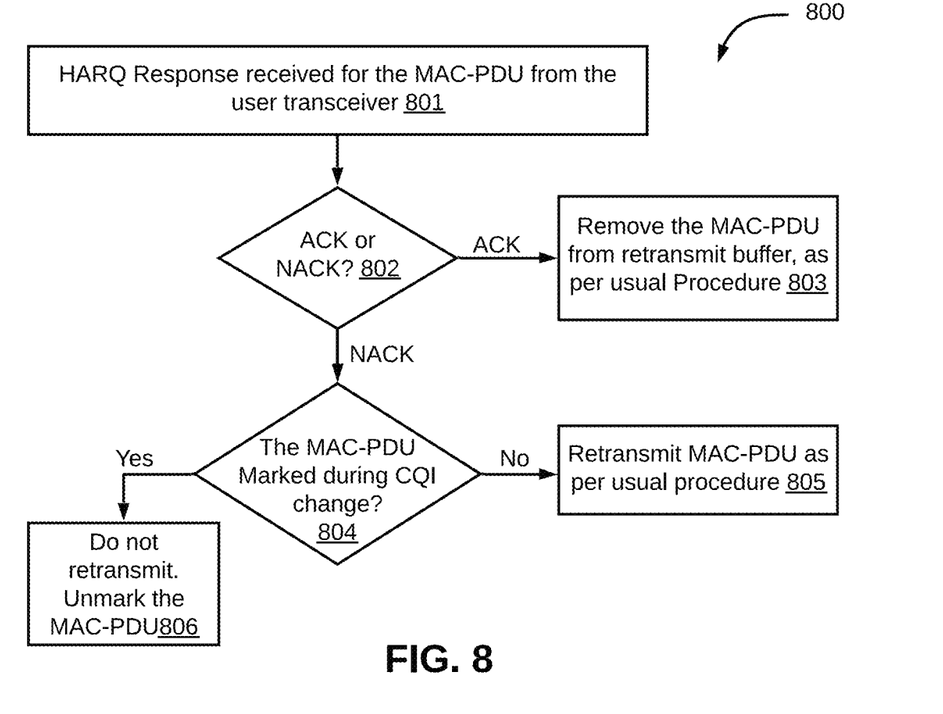
FIG. 8 is a flow diagram of an exemplary process for handling a transmitted data packet upon receiving a HARQ ACK signal or a HARQ NACK signal from the user transceiver, in accordance with some embodiments of the present disclosure.

Referring now to FIG. 8, a flow diagram of an exemplary process 800 for handling a transmitted data packet upon receiving a HARQ ACK signal or a HARQ NACK signal from the user transceiver is depicted via a flowchart, in accordance with some embodiments of the present disclosure. At step 801, the HARQ process may receive HARQ response for the transmitted data packet from the user transceiver 202. At step 802, a check may be performed to identify whether the HARQ response corresponding to the transmitted data packet is a HARQ-ACK signal or HARQ-NACK signal. If the HARQ ACK signal corresponding to the transmitted data packet has been received, then, at step 803, the transmitted data packet may be removed from the HARQ retransmission buffer 304. However, if the HARQ NACK signal corresponding to the transmitted data packet has been received, then, at step 804, the check may be performed to identify whether the transmitted data packet has been marked on not. Thereafter, based on the check performed, if the transmitted data packet is identified as not marked, then, at step 805, the transmitted data packet may be retransmitted as per standard HARQ procedure. However, if the transmitted data packet is identified as marked, then, at step 806, the transmitted data packet may not be retransmitted as it has already been retransmitted earlier in accordance with aspects of the present disclosure. In an embodiment, at step 806, such marked retransmitted data packet may be unmarked and the HARQ process may wait for corresponding HARQ response from the user transceiver 202.

Figure 9:
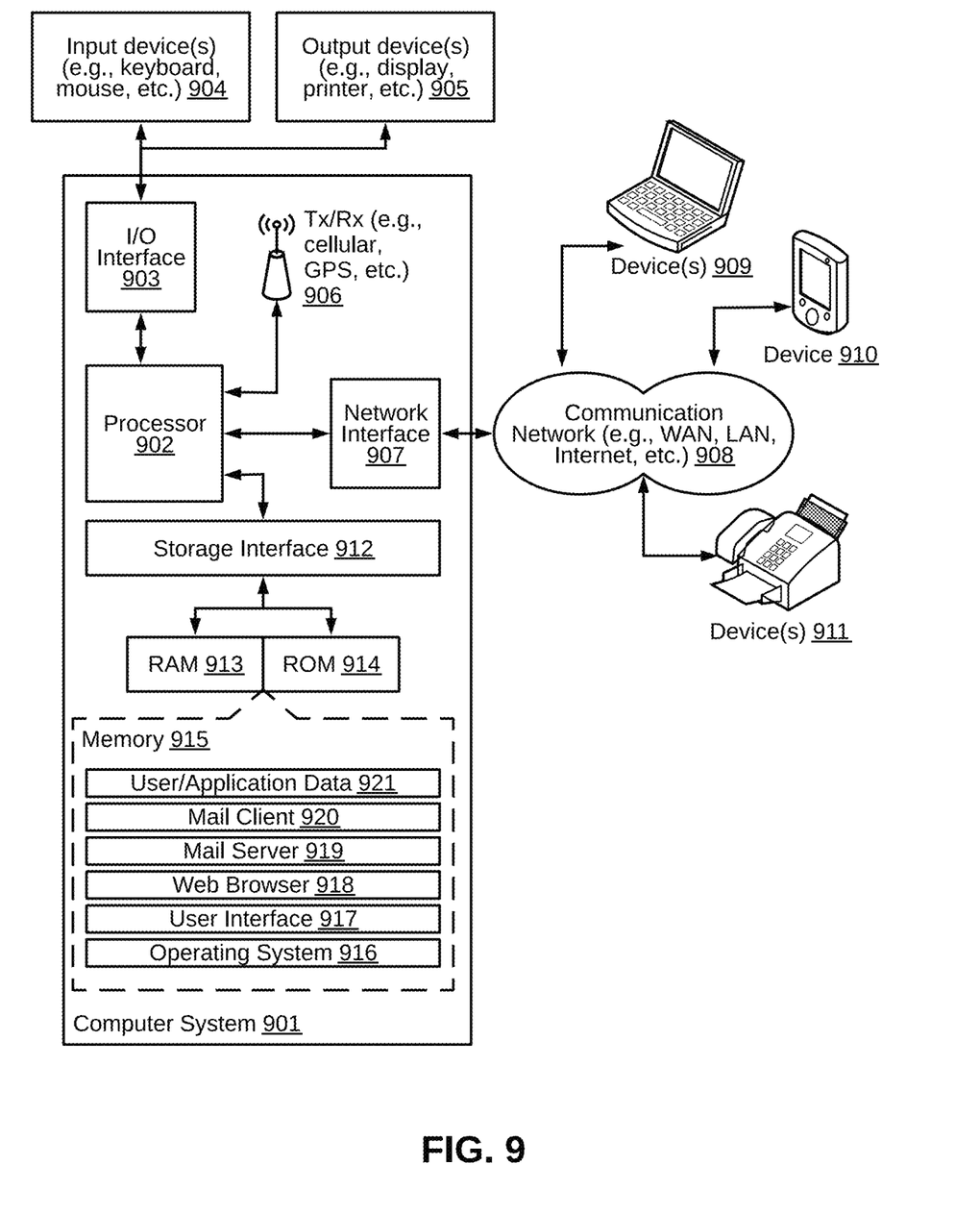
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing various embodiments is illustrated. Computer system 901 may include a central processing unit ("CPU" or "processor") 902. Processor 902 may include at least one data processor for executing program components for executing user-generated or system-generated requests. A user may include a person, a person using a device such as those included in this disclosure, or such a device itself. Processor 902 may include specialized processing units such as integrated system (bus) controllers, memory management control units, floating point units, graphics processing units, digital signal processing units, etc. Processor 902 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via an I/O interface 903. I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 903, computer system 901 may communicate with one or more I/O devices. For example, an input device 904 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 905 may be a printer, fax machine, video display (for example, cathode ray tube (CRT), liquid crystal display (LCD), light-emitting diode (LED), plasma, or the like), audio speaker, etc. In some embodiments, a transceiver 906 may be disposed in connection with processor 902. Transceiver 906 may facilitate various types of wireless transmission or reception. For example, transceiver 906 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.11 a/b/g/n/x, Bluetooth, FM, global positioning system (GPS), 2G/3G HSDPA/HSUPA communications, etc.

In some embodiments, processor 902 may be disposed in communication with a communication network 908 via a network interface 907. Network interface 907 may communicate with communication network 908. Network interface 907 may employ connection protocols including, without limitation, direct connect, Ethernet (for example, twisted pair 10/100/1000 Base T), transmission control protocol/internet protocol (TCP/IP), token ring, IEEE 802.11 a/b/g/n/x, etc. Communication network 908 may include, without limitation, a direct interconnection, local area network (LAN), wide area network (WAN), wireless network (for example, using Wireless Application Protocol), the Internet, etc. Using network interface 907 and communication network 908, computer system 901 may communicate with devices 909, 910, and 911. These devices 909, 910, and 911 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 901 may itself embody one or more of these devices 909, 910, and 911.

In some embodiments, processor 902 may be disposed in communication with one or more memory devices (for example, RAM 913, ROM 914, etc.) via a storage interface 912. Storage interface 912 may connect to memory 915 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 915 may store a collection of program or database components, including, without limitation, an operating system 916, user interface application 917, web browser 918, mail server 919, mail client 920, user/application data 921 (for example, any data variables or data records discussed in this disclosure), etc. Operating system 916 may facilitate resource management and operation of computer system 901. Examples of operating systems 916 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 917 may facilitate display, execution, interaction, manipulation, or operation of program components through textual or graphical facilities. For example, user interfaces 917 may provide computer interaction interface elements on a display system operatively connected to computer system 901, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS®, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 901 may implement a web browser 918 stored program component. Web browser 918 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 918 may utilize facilities such as AJAX, DHTML, ADOBE® FLASH® platform, JAVASCRIPT® programming language, JAVA® programming language, application programming interfaces (APIs), etc. In some embodiments, computer system 901 may implement a mail server 919 stored program component. Mail server 919 may be an Internet mail server such as MICROSOFT® EXCHANGE® mail server, or the like. Mail server 919 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 919 may utilize communication protocols such as internet message access protocol (IMAP), messaging application programming interface (MAPI), Microsoft® Exchange, post office protocol (POP), simple mail transfer protocol (SMTP), or the like. In some embodiments, computer system 901 may implement a mail client 920 stored program component. Mail client 920 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 901 may store user/application data 921, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for transmitting a data packet in downlink in FDD communication mode employing adaptive asynchronous HARQ mode. The method and system may receive a current CQI from a user transceiver. Moreover, the CQI may be reported by the user transceiver at a periodic interval based on a radio frequency channel condition. The method and system may evaluate a degradation in the radio frequency channel condition based on a decrease in the current CQI with respect to a previously reported CQI. The method and system may retransmit at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver.

Moreover, benefit of present invention may include enablement of early HARQ retransmissions, in a unique way, based on the CQI indication reported from the user transceiver. In addition, the present invention may enable the user to configure and thus control the early HARQ retransmissions, as required. Also, with help of the present invention, a latency time of communication may be lowered between the base transceiver (e.g., eNodeB) and the user transceiver (e.g., UE) during channel fading situations when the latency is expected to increase. In addition, the present invention, may be less complex and less CPU intensive. Moreover, the present invention may reuse the existing HARQ and CQI functionality framework of the current base transceiver functionality.

The specification has described method and system for transmitting a data packet in downlink in FDD communication mode employing adaptive asynchronous HARQ mode. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transmitting a data packet in downlink in frequency division duplex (FDD) communication mode employing adaptive asynchronous Hybrid Automatic Repeat Request (HARQ) mode, the method comprising:

receiving, by a base transceiver, a current Channel Quality Indicator (CQI) from a user transceiver, wherein the CQI is reported by the user transceiver at a periodic interval based on a radio frequency channel condition;

evaluating, by the base transceiver, a degradation in the radio frequency channel condition based on a decrease in the current CQI with respect to a previously reported CQI; and retransmitting, by the base transceiver, at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver, wherein the set of transmitted data packets are transmitted to the user transceiver in FDD communication mode employing adaptive asynchronous HARQ mode.

2. The method claim 1, wherein a CQI is based on an observed signal-to-interference-plus-noise ratio (SINR) at the user transceiver and corresponds to a Modulation and Coding Scheme (MCS) value indicating a downlink transmission data rate, and wherein the data packet comprises Media Access Layer Packet Data Unit (MAC-PDU).

3. The method claim 1, wherein evaluating the degradation in the radio frequency channel condition comprises comparing the decrease with a preconfigured CQI decrease threshold.

4. The method claim 1, wherein the set of transmitted data packets correspond to more recent of data packets transmitted in last eight milliseconds or data packets transmitted since the previously reported CQI.

5. The method of claim 1, further comprising marking, upon the retransmission and by the base transceiver, the at least one of the set of transmitted data packets for non-retransmission upon receipt of the corresponding HARQ NACK signal.

6. The method of claim 5, further comprising:
performing a check on whether a transmitted data packet is marked or not upon receiving the corresponding HARQ NACK signal;
retransmitting the transmitted data packet, if not marked; and
unmarking the transmitted data packet, if marked.

7. The method of claim 6, further comprising:
removing each of the transmitted data packets from the HARQ retransmission buffer upon receiving a corresponding HARQ acknowledgement (ACK) signal.

8. A system for transmitting a data packet in downlink in frequency division duplex (FDD) communication mode employing adaptive asynchronous Hybrid Automatic Repeat Request (HARQ) mode, the system comprising:
a base transceiver communicatively coupled to a user transceiver, the base transceiver comprising a processor and a memory communicatively coupled to the processor, wherein the memory stores processor-executable instructions, which, on execution, causes the processor to:
receive a current Channel Quality Indicator (CQI) from a user transceiver, wherein the CQI is reported by the user transceiver at a periodic interval based on a radio frequency channel condition;
evaluate a degradation in the radio frequency channel condition based on a decrease in the current CQI with respect to a previously reported CQI; and
retransmit at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver, wherein the set of transmitted data packets are transmitted to the user transceiver in FDD communication mode employing adaptive asynchronous HARQ mode.

9. The system of claim 8, wherein a CQI is based on an observed signal-to-interference-plus-noise ratio (SINR) at the user transceiver and corresponds to a Modulation and Coding Scheme (MCS) value indicating a downlink transmission data rate, and wherein the data packet comprises Media Access Layer Packet Data Unit (MAC-PDU).

10. The system of claim 8, wherein evaluating the degradation in the radio frequency channel condition comprises comparing the decrease with a preconfigured CQI decrease threshold.

11. The system of claim 8, wherein the set of transmitted data packets correspond to more recent of data packets transmitted in last eight milliseconds or data packets transmitted since the previously reported CQI.

12. The system of claim 8, wherein the processor-executable instructions, on execution, further causes the processor to mark, upon the retransmission, the at least one of the set of transmitted data packets for non-retransmission upon receipt of the corresponding HARQ NACK signal.

13. The system of claim 12, wherein the processor-executable instructions, on execution, further causes the processor to:
perform a check on whether a transmitted data packet is marked or not upon receiving the corresponding HARQ NACK signal;
retransmit the transmitted data packet, if not marked; and
unmark the transmitted data packet, if marked.

14. The system of claim 13, wherein the processor-executable instructions, on execution, further causes the processor to remove each of the transmitted data packets from the HARQ retransmission buffer upon receiving a corresponding HARQ acknowledgement (ACK) signal.

15. A non-transitory computer-readable storage medium storing computer-executable instructions for:
receiving a current Channel Quality Indicator (CQI) from a user transceiver, wherein the CQI is reported by the user transceiver at a periodic interval based on a radio frequency channel condition;
evaluating a degradation in the radio frequency channel condition based on a decrease in the current CQI with respect to a previously reported CQI; and
retransmitting at least one of a set of transmitted data packets stored in a HARQ retransmission buffer to the user transceiver, based on the degradation in the radio frequency channel condition and without waiting for a corresponding HARQ negative acknowledgement (NACK) signal from the user transceiver, wherein the set of transmitted data packets are transmitted to the user transceiver in FDD communication mode employing adaptive asynchronous HARQ mode.

* * * * *